UNITED STATES PATENT OFFICE.

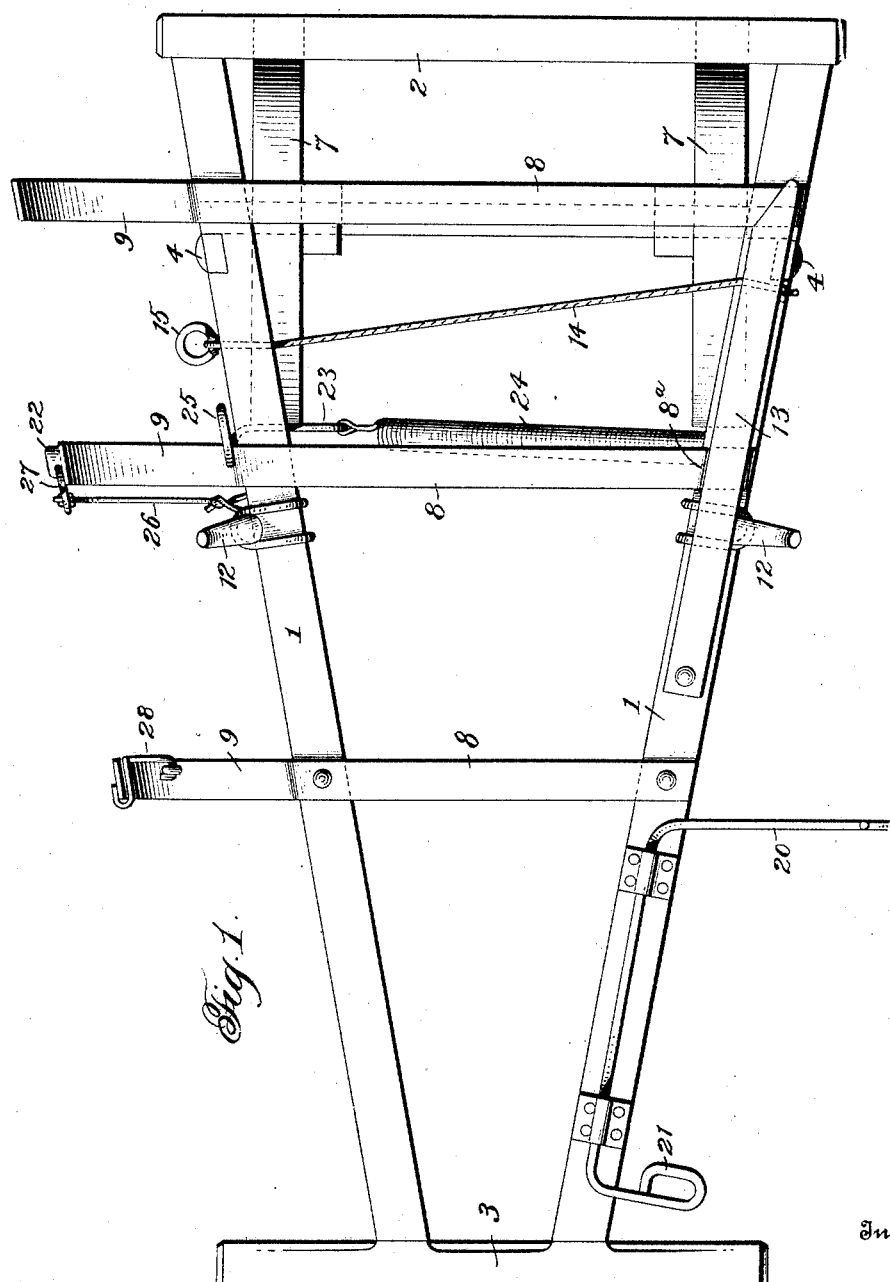

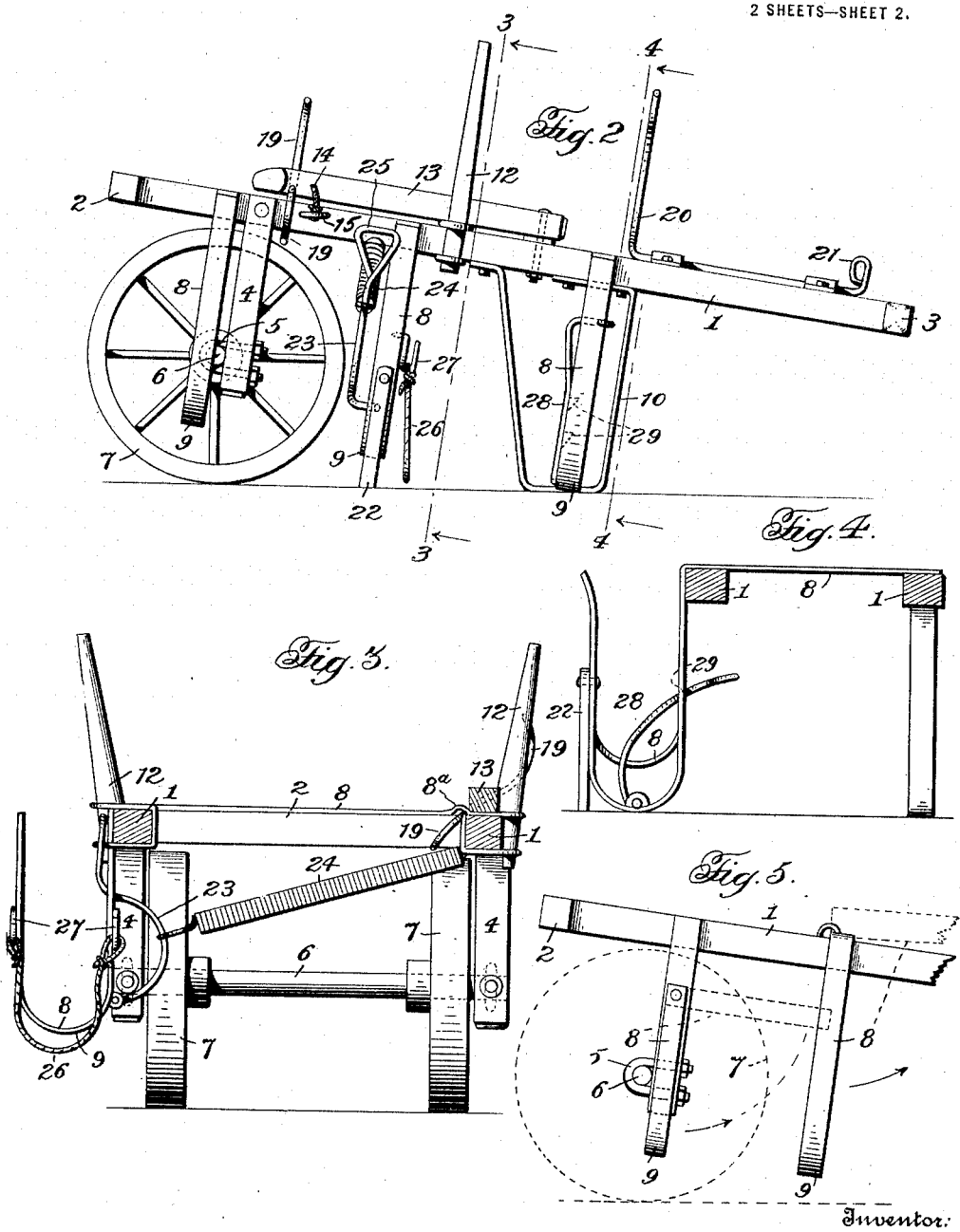

JOHN K. ALLEMAN, OF AMBERSON, PENNSYLVANIA.

HUSKING-TRUCK AND FODDER-BINDER.

1,367,344.   Specification of Letters Patent.   Patented Feb. 1, 1921.

Application filed October 9, 1919.  Serial No. 329,587.

*To all whom it may concern:*

Be it known that I, JOHN K. ALLEMAN, a citizen of the United States, and a resident of Amberson, in the county of Franklin and State of Pennsylvania, have invented certain new and useful Improvements in Husking-Trucks and Fodder-Binders; and I do hereby declare the following to be a full, clear, and exact description of the invention, such as will enable others skilled in the art to which it appertains to make and use the same.

My invention relates to an improvement in husking truck and fodder binder and it consists in a truck which forms a shock gatherer and a husking table, and a cradle at the side of the truck into which the stalks are deposited and subsequently tied into bundles.

It further consists in parts and combination of parts for holding the stalks against the table while gathering up the shocks; for moving the stalks toward the operator at the cradle side of truck while husking the corn and for compressing the stalks in the cradle for binding.

In the accompanying drawings Figure 1 is a view in plan of my improved truck and binder; Fig. 2 is a view in side elevation of the same; Fig. 3 is a view in section on the line 3—3 in the direction of the arrows; Fig. 4 is a view in section on the line 4—4 and Fig. 5 is a view of a modified form.

The truck frame is composed of two side members 1, a transverse member 2 connecting the side members at the rear ends of the latter and a handle 3 connecting the side members at the front. The side members diverge from the handle end, so that the frame is considerably wider at the rear end than at its handle end, and is provided near its rear end with the depending brackets 4 carrying the axle bearings 5 in which the axle 6 is secured. This axle carries two ground wheels 7 mounted to rotate thereon, and of such diameter, and so located with relation to the rear transverse member 2, that when the frame is turned to a vertical position, it will be supported in such position by the wheels and rear member 2 resting on the ground.

The side members 1 are connected intermediate the rear end member 2 and handle 3 by the transverse straps 8 preferably made of metal and disposed equal distances apart to form a table or support for the corn stalks thereon, and these straps are preferably continued over one side of the truck and bent downwardly, outwardly and upwardly as shown to approximately the plane of the table, thus forming a series of U-shaped supports 9, the three of which constitute a cradle into which the stalks or fodder are dropped after the corn has been removed. These U-shaped supports are of such length that when the table or truck is in its horizontal position, the end support 9 nearest the handle, and the foot 10 at the opposite side of the frame constitute the feet which support the free end of the table in approximately horizontal position.

The frame is provided with removable side staves 12 for preventing the stalks from falling off at the sides, and it is also provided with the pusher arm 13 pivoted at its front end and free at its rear end. This pusher arm is located at the side farthest removed from the cradle, and connected to a cord 14 which passes through the side member 1 adjacent the cradle and is provided with a ring 15 which may be grasped by the operator and pulled to swing the free end of the pusher arm toward the operator, and thus push the stalks on the truck over to the operator. This pusher arm normally rests over the side member 1 farthest removed from the cradle so as not to interfere with the gathering up of the shocks, and is yieldingly held in such position by a bend in the middle or intermediate strap 8. This bend in the strap forms a curved or yielding shoulder 8ª against which the pusher arm normally rests, and which as above stated holds the pusher arm in its normal position.

By pulling on the cord 14 the pusher arm rides up and over the shoulder 8ª and is then free to be pulled toward the operator. This pusher arm also carries the upwardly and downwardly projecting curved fingers 19 which with the side stave 12 operates to hold the stalks in place and prevent them from falling off the far side of the truck.

Hinged to the truck at the far side thereof and nearer the handle end of the latter is the hook 20, having an operating handle 21. In the operation of the apparatus the truck is moved to a shock and turned up on its rear end. The operator then manipulates the hook 20 to embrace the shock and hold it while he turns the truck to a horizontal position, the engagement of the hook with the shock operating to hold the latter on the truck while turning the truck from its vertical to its horizontal position.

In order to relieve the U-shaped member of the cradle which forms a side foot or rest for the truck when the latter is horizontal, of the entire weight falling on that side of the truck, I have provided the second or intermediate U-shaped member with a pivoted leg 22 which may be turned down to rest on the ground and assist in supporting the weight.

In the operation of the truck one or more shocks of corn are picked up on the truck, as above explained, the truck then forming a table on which the stalks rest while the operator or operators remove the corn which is thrown to the ground or into receptacles located convenient to the operator. After all the corn has been removed from the stalk the latter is then dropped into the cradle at the side. After a sufficient number of stalks have been deposited in the cradle to form a bundle, they are compressed by drawing down on the clamp 23. This clamp is bent as shown and is pivoted to the rear face of the second or intermediate member of the cradle and is normally out of the way and held so by the spring 24 so as not to interfere with the free discharge of the stalks from the table to the cradle. It is provided at its free end with a handle 25 which is first grasped by the hand and pulled over into position over the stalks and is then pressed upon by the foot of the operator to compress the stalks at the center for binding.

The binding cords 26 which are preferably looped at one end and knotted at the other end, are strung on the hooks 27 on the middle member of the cradle, so that when the stalks fall into the cradle they are partly embraced by the binding cords, and when a sufficient number of stalks has been deposited to form a bundle or sheaf, they are compressed by the clamp, and then tied by taking the knot in the uppermost cord from one hook 27 and passing it through the loop of the same cord strung on the other hook 27, and then by releasing the pressure on the clamp, the expansion of the stalks causes the knot to be caught by the loop and hold the bundle securely bound.

If desired the U-shaped member of the cradle, nearest the handle, may be provided with a clamp 28 hinged at one end to the said member near its bottom and free at its other end, the free end adapted to be engaged by one of the teeth 29 formed on the inner or rear upright portion of said U-shaped member. The extreme upper end of the clamp 28 is made hook shape so as to normally engage the outer portion of said U-shaped member and be held out of the way. When however it is desired to clamp the stalks in the cradle, as for instance, when the latter is only partly filled and it is necessary to move the truck to pick up another shock, the stalks in the cradle can be held in place by the clamp 28.

With this apparatus the truck can be moved over the field and after picking up the shocks, form the husking table. The stalks after being freed of the ears of corn are dropped into the cradle and subsequently bound up into bundles which are left in the field to be subsequently gathered up and used for fodder.

Instead of continuing the transverse straps 8 over the side of the machine to form the cradle, the latter can be formed by independent parts some or all of which may be hinged to the frame, as shown in Fig. 5, so that they will yield or give when in contact with stubble, or which may be turned up under the truck when the latter is being transported from one point to another.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. As a new article of manufacture a husking truck and fodder binder consisting of a two wheeled truck, a manually operated hook shaped arm hinged to the truck frame and adapted to grasp the stalks and hold them on the truck, and a cradle at one side of the truck to receive the stalks after the corn has been removed from the stalks.

2. As a new article of manufacture a husking truck and fodder binder consisting of a two wheeled truck, a manually operated hook shaped arm hinged to the truck frame and adapted to grasp the stalks and hold them on the frame while the latter is being turned from its vertical to its horizontal position, a cradle at one side of the truck to receive the stalks after the corn has been removed and a clamp for holding the stalks in the cradle.

3. As a new article of manufacture a husking truck and fodder binder consisting of a two wheeled truck adapted to be turned on end to receive a shock and then turned horizontally to form a husking table, a cradle at one side of the truck frame to receive the stalks and means adjacent the cradle for carrying prepared binder cords for tying up the bundles.

4. As a new article of manufacture a husking truck and fodder binder consisting of a two wheeled truck adapted to be turned on its end to receive a shock of stalks, a manually operated hinged hook shaped arm for grasping the shock and holding it against the truck, a cradle at one side of the truck to receive the stalks, and a clamp for compressing the stalks in the cradle while binding the latter into a bundle.

5. As a new article of manufacture a husking truck and fodder binder consisting of a two wheeled truck having a handle at one end and a cradle at one side, and a pusher arm loosely connected with the truck at the side thereof farthest removed from the cradle and means for actuating said arm whereby the stalks on the truck may be pushed toward the operator at the cradle side of the truck.

6. As a new article of manufacture a husking truck and fodder binder consisting of a wheeled truck, the wheels being adjacent one end and a handle at the other end, a manually operated hook adjacent the handle end of the truck for grasping the shock when the truck is turned on its end to pick up the same, a cradle at one side of the truck to receive the stalks, a manually operated clamp for compressing the stalks in the cradle and a spring for withdrawing the clamp after the same has been released.

7. As a new article of manufacture a husking truck and fodder binder consisting of a wheeled truck having a handle at one end, the said truck forming a corn husking table, a cradle at one side of the truck to receive the corn stalks, a manually operated pusher arm at the far side of the table for moving the stalks over to the cradle side, a manually operated clamp for compressing the stalks in the cradle, and hooks carried by a member of the cradle for holding prepared binding cords for tying the bundles of stalks.

8. As a new article of manufacture a husking truck and fodder binder consisting of a two wheeled truck having a handle at one end, removable side stakes, and a manually operated hook shaped arm hinged to the truck and adapted to be actuated to embrace the shock when the truck is turned on end and hold the same until the truck has been turned to horizontal position.

9. As a new article of manufacture a husking truck and fodder binder consisting of a two wheeled truck having a handle at one end and a cradle at one side, a manually operated hook-shaped arm hinged to the truck adjacent the handle end of the latter, a manually operated pusher arm for pushing the stalks toward the cradle side of the truck, a manually operated clamp for holding the stalks in the cradle and hooks carried by the cradle adjacent the clamp for holding prepared binding cords for tying the clamped bundles.

In testimony whereof, I have signed this specification in the presence of two subscribing witnesses.

JOHN K. ALLEMAN.

Witnesses:
CHAS. E. SHIELDS,
CHAS. R. PORTER.